(12) United States Patent
Al-Dhafeeri et al.

(10) Patent No.: US 11,746,649 B2
(45) Date of Patent: Sep. 5, 2023

(54) LEAK DETECTION FOR ELECTRIC SUBMERSIBLE PUMP SYSTEMS

(71) Applicant: Saudi Arabian Oil Company, Dhahran (SA)

(72) Inventors: Abdullah M. Al-Dhafeeri, Al Khobar (SA); Saad Ahmed Al Sdeiri, Khafji (SA)

(73) Assignee: Saudi Arabian Oil Company, Dhahran (SA)

( * ) Notice: Subject to any disclaimer, the term of this patent is extended or adjusted under 35 U.S.C. 154(b) by 39 days.

(21) Appl. No.: 17/647,677

(22) Filed: Jan. 11, 2022

(65) Prior Publication Data
US 2022/0220844 A1 Jul. 14, 2022

Related U.S. Application Data

(60) Provisional application No. 63/136,520, filed on Jan. 12, 2021.

(51) Int. Cl.
*E21B 47/117* (2012.01)
*G01M 3/28* (2006.01)
(Continued)

(52) U.S. Cl.
CPC .......... *E21B 47/117* (2020.05); *E21B 43/128* (2013.01); *E21B 47/008* (2020.05);
(Continued)

(58) Field of Classification Search
CPC .... E21B 47/117; E21B 43/128; E21B 47/008; E21B 47/06; E21B 33/12; E21B 34/06; E21B 47/00; G01M 3/2846; G01M 3/2815
See application file for complete search history.

(56) References Cited

U.S. PATENT DOCUMENTS 3,503,447 A * 3/1970 Hamby, Jr. ............. E21B 47/11
166/254.2
4,346,594 A * 8/1982 Owings ................... E21B 21/08
73/152.41

(Continued)

OTHER PUBLICATIONS

U.S. Appl. No. 17/648,047, filed Jan. 14, 2022, Al-Dhafeeri et al.
(Continued)

*Primary Examiner* — Steven A Macdonald
(74) *Attorney, Agent, or Firm* — Fish & Richardson P.C.

(57) ABSTRACT

A method of determining a presence of a leak in a wall of a production tubing string includes positioning an electrical submersible pump is positioned at the string's downhole end. Based on measurements from a pressure sensor positioned at a downhole location at a discharge end of the electrical submersible pump, it is determined that a discharge pressure has decreased over a specified time period. Based on measurements from a pressure sensor within a wellhead of the well, it is determined that a pressure within the production tubing string at the surface has decreased over the specified time period. Based on measurements from a flow-rate sensor at an uphole end of the production tubing string, it is determined the flow rate has decreased relative to a calculated expected flow rate. Based on a pressure integrity test initiated in response to these determinations, the presence of the leak is determined.

18 Claims, 8 Drawing Sheets

(51) Int. Cl.
  *E21B 43/12* (2006.01)
  *E21B 47/008* (2012.01)
  *E21B 47/06* (2012.01)
  *E21B 33/12* (2006.01)
  *E21B 34/06* (2006.01)

(52) U.S. Cl.
  CPC .......... *E21B 47/06* (2013.01); *G01M 3/2846* (2013.01); *E21B 33/12* (2013.01); *E21B 34/06* (2013.01)

(56) References Cited

U.S. PATENT DOCUMENTS

| | | | | |
|---|---|---|---|---|
| 5,018,589 | A * | 5/1991 | Williams | E21B 21/08 175/48 |
| 5,374,163 | A * | 12/1994 | Jaikaran | E21B 43/129 417/172 |
| 5,887,657 | A * | 3/1999 | Bussear | E21B 49/08 166/336 |
| 6,904,981 | B2 * | 6/2005 | van Riet | E21B 21/08 175/207 |
| 9,494,710 | B2 * | 11/2016 | Gonzales | G01V 99/005 |
| 9,500,073 | B2 * | 11/2016 | Xiao | E21B 47/10 |
| 9,528,364 | B2 * | 12/2016 | Samuel | E21B 47/006 |
| 10,677,032 | B1 * | 6/2020 | Norton | E21B 47/008 |
| 2009/0194330 | A1 * | 8/2009 | Gray | E21B 21/062 175/48 |
| 2010/0307743 | A1 * | 12/2010 | Ziuddin | E21B 47/10 166/250.03 |
| 2012/0000676 | A1 * | 1/2012 | Mebratu | E21B 33/14 166/387 |
| 2015/0090445 | A1 * | 4/2015 | Miller | E21B 47/06 166/255.1 |
| 2015/0184504 | A1 * | 7/2015 | Ringer | E21B 47/10 702/6 |
| 2015/0354346 | A1 * | 12/2015 | Franklin | G01M 3/26 702/51 |
| 2015/0354347 | A1 * | 12/2015 | Franklin | E21B 47/117 702/51 |
| 2016/0201452 | A1 * | 7/2016 | Anisur Rahman | E21B 47/10 702/13 |
| 2017/0058664 | A1 * | 3/2017 | Xiao | E21B 47/06 |
| 2017/0314357 | A1 * | 11/2017 | Kent | G01N 15/0826 |
| 2017/0356291 | A1 * | 12/2017 | Spoerker | E21B 49/008 |
| 2017/0363088 | A1 * | 12/2017 | Nguyen | E21B 47/008 |
| 2019/0128113 | A1 * | 5/2019 | Ross | E21B 47/13 |
| 2020/0095861 | A1 * | 3/2020 | Camilleri | E21B 47/06 |
| 2022/0220844 | A1 * | 7/2022 | Al-Dhafeeri | E21B 47/008 |

OTHER PUBLICATIONS

U.S. Appl. No. 17/648,050 filed Jan. 14, 2022, Al-Dhafeeri et al.
Al-Dhafeeri et al. "Lessons Learned from Tubing Leaks in ESP Completion at Offshore Field," IPTC-20032, presented at the International Petroleum Technology Conference, Jan. 2020, 20 pages.
Li et al., "Condition Monitoring and Fault Diagnosis of Electric Submersible Pump Based on Wellhead Electrical Parameters and Production Parameters," System Science & Control Engineering, 2018, 6(3):253-261, 10 pages.

* cited by examiner

LEAK DETECTION FOR ELECTRIC SUBMERSIBLE PUMP SYSTEMS

CROSS-REFERENCE TO RELATED PATENT APPLICATIONS

This application claims the benefit of priority to U.S. Patent Application No. 63/136,520, filed Jan. 12, 2021, the contents of which are incorporated by reference herein.

TECHNICAL FIELD

This disclosure relates to production of oil, gas, and other fluids from subterranean formations.

BACKGROUND

Electrical submersible pumps (ESPs) are artificial lift systems that utilize a downhole pumping system that is electrically driven, to increase production of fluids from a well.

SUMMARY

Certain aspects of the subject matter herein can be implemented as a method of determining a presence of a leak in a wall of a production tubing string positioned within a well drilled into a subterranean formation. An electrical submersible pump is positioned at a downhole end of the production tubing string, and the electric submersible pump is configured to pump fluids from the subterranean zone in an uphole direction through the production tubing string. The method includes determining, based on measurements from a pressure sensor positioned at a downhole location at a discharge end of the electrical submersible pump, that a discharge pressure of fluid flowing from the electrical submersible pump in the uphole direction through the production tubing string has decreased over a specified time period. The method further includes determining, based on measurements from a pressure sensor positioned at a surface location within a wellhead of the well, that a pressure within the production tubing string at the surface has decreased over the specified time period. The method further includes determining, based on measurements from a flow-rate sensor positioned at an uphole end of the production tubing string, that a flow rate of fluids from the uphole end of the production tubing string has decreased relative to a calculated expected flow rate of fluids through the production tubing string at the discharge end of the electrical submersible pump over the specified time period. In response to these determinations, a pressure integrity test of the production tubing string is initiated. Based on the pressure integrity test, the presence of the leak is determined.

An aspect combinable with any of the other aspects can include the following features. The method can further include determining, based on measurements from a pressure sensor positioned at a downhole location at an intake of the electrical submersible pump, that an intake pressure of fluid flowing into the electrical submersible pump has increased over the specified time period. The pressure integrity test can be further in response to the determining that the intake pressure has increased over the specified time period.

An aspect combinable with any of the other aspects can include the following features. The method can further include determining, based on a measurement from a pressure sensor positioned within a tubing-casing annulus of the well, that a tubing-casing annulus pressure has not increased in response an initiation of operation of the electrical submersible pump. The initiating of the pressure integrity test can be further in response to the determining that the tubing-casing annulus pressure has not increased in response to the initiation of the operation.

An aspect combinable with any of the other aspects can include the following features. The well can include a packer assembly positioned on the production tubing string above the electrical submersible pump. The packer assembly can be configured to prevent a flow of fluids within the tubing-casing annulus, and the pressure sensor can be positioned within the tubing-casing annulus uphole of the packer assembly.

An aspect combinable with any of the other aspects can include the following features. The leak can be downhole of the packer assembly.

An aspect combinable with any of the other aspects can include the following features. The calculated expected flow rate of fluids through the production tubing string at the discharge end of the electrical submersible pump can be based on an intake pressure of fluid flowing into the electrical submersible pump has increased over the specified time period.

An aspect combinable with any of the other aspects can include the following features. The determining of the presence of the leak can be a first instance of a leak detection sequence, and the method can further include a second instance of a leak detection sequence. The second instance of the leak detection sequence can include determining, based on a first measurement from a pressure sensor positioned within a tubing-casing annulus of the well, that a tubing-casing annulus pressure has increased in response an initiation of operation of the electrical submersible pump. A shut-down of the electrical submersible pump can be initiated, and a subsurface safety valve positioned on the production tubing string uphole of the electrical submersible pump can be closed. The method can further include determining, while bleeding off pressure from within the production tubing string and based on a second measurement from the pressure sensor positioned within the tubing-casing annulus, that the tubing-casing annulus pressure has decreased in response to the bleeding off of the pressure. The presence of the leak can be determined based on the decrease in the tubing-casing pressure in response to the bleeding off of the pressure.

An aspect combinable with any of the other aspects can include the following features. The well can include a packer assembly positioned on the production tubing string above the electrical submersible pump. The packer assembly can be configured to prevent a flow of fluids within the tubing-casing annulus. The pressure sensor can be positioned within the tubing-casing annulus is uphole of the packer assembly.

An aspect combinable with any of the other aspects can include the following features. The leak can be uphole of the packer assembly.

Certain aspects of the subject matter herein can be implemented as a computer-implemented method. The computer-implemented method includes determining, by a computer system and based on measurements from a pressure sensor positioned at a downhole location at a discharge end of the electrical submersible pump, that a discharge pressure of fluid flowing from the electrical submersible pump in the uphole direction through the production tubing string has decreased over a specified time period. The method further includes determining, by the computer system and based on measurements from a pressure sensor positioned at a surface location within a wellhead of the well, that a pressure within the production tubing string at the surface has decreased over the specified time period. The method further includes determining, by the computer system and based on measurements from a flow-rate sensor positioned at an uphole end of the production tubing string, that a flow rate of fluids from the uphole end of the production tubing string has decreased relative to a calculated expected flow rate of fluids through the production tubing string at the discharge end of the electrical submersible pump over the specified time period. In response to these determinations, a pressure integrity test of the production tubing string is initiated, and, based on the pressure integrity test, the presence of the leak is determined.

An aspect combinable with any of the other aspects can include the following features. The computer-implemented method can further include determining, by the computer system and based on measurements from a pressure sensor positioned at a downhole location at an intake of the electrical submersible pump, that an intake pressure of fluid flowing into the electrical submersible pump has increased over the specified time period. The initiating of the pressure integrity test can be further in response to the determining that the intake pressure has increased over the specified time period.

An aspect combinable with any of the other aspects can include the following features. The computer-implemented method can further include determining, by the computer system and based on a measurement from a pressure sensor positioned within a tubing-casing annulus of the well, that a tubing-casing annulus pressure has not increased in response an initiation of operation of the electrical submersible pump. The initiating of the pressure integrity test can be further in response to the determining that the tubing-casing annulus pressure has not increased in response to the initiation of the operation.

An aspect combinable with any of the other aspects can include the following features. The well can include a packer assembly positioned on the production tubing string above the electrical submersible pump, the packer assembly configured to prevent a flow of fluids within the tubing-casing annulus. The pressure sensor can be positioned within the tubing-casing annulus uphole of the packer assembly.

An aspect combinable with any of the other aspects can include the following features. The leak can be downhole of the packer assembly.

An aspect combinable with any of the other aspects can include the following features. The calculated expected flow rate of fluids through the production tubing string at the discharge end of the electrical submersible pump can be based on an intake pressure of fluid flowing into the electrical submersible pump has increased over the specified time period.

An aspect combinable with any of the other aspects can include the following features. The determining of the presence of the leak can be a first instance of a leak detection sequence, and the computer-implemented method can further include a second instance of a leak detection sequence. The second instance of the leak detection sequence can include determining, by the computer system and based on a first measurement from a pressure sensor positioned within a tubing-casing annulus of the well, that a tubing-casing annulus pressure has increased in response an initiation of operation of the electrical submersible pump. The computer-implemented method can also include initiating a shut-down of the electrical submersible pump, closing off a subsurface safety valve positioned on the production tubing string uphole of the electrical submersible pump, and determining, by the computer system and while bleeding off pressure from within the production tubing string and based on a second measurement from the pressure sensor positioned within the tubing-casing annulus, that the tubing-casing annulus pressure has decreased in response to the bleeding off of the pressure. The presence of the leak can be determined based on the decrease in the tubing-casing pressure in response to the bleeding off of the pressure.

An aspect combinable with any of the other aspects can include the following features. The well can include a packer assembly positioned on the production tubing string above the electrical submersible pump. The packer assembly can be configured to prevent a flow of fluids within the tubing-casing annulus, and wherein the pressure sensor positioned within the tubing-casing annulus is uphole of the packer assembly.

An aspect combinable with any of the other aspects can include the following features. The leak can be uphole of the packer assembly.

The details of one or more embodiments are set forth in the accompanying drawings and the description below. Other features, objects, and advantages will be apparent from the description and drawings, and from the claims.

DETAILED DESCRIPTION

The details of one or more implementations of the subject matter of this specification are set forth in this detailed description, the accompanying drawings, and the claims. Other features, aspects, and advantages of the subject matter will become apparent from this detailed description, the claims, and the accompanying drawings.

Production tubing string leakage in wells equipped with electrical submersible pumps (ESPs) can be one of the main challenges during production phase of a well. Such leaks can be due to different causes such as corrosive fluids, sand production, and material failure. Production tubing string leaks can increase rig operation costs and decrease production. Moreover, determination of the presence, severity, and location of production tubing string leaks can be costly and disruptive.

In accordance with some embodiments of the present disclosure, a method is provided of detecting the presence and location of links in production tubing string above an ESP. The method can provide an improved approach to detecting such leaks by using measurements of both surface and downhole parameters and integrating such surface and downhole measurements during operation of the ESP. By alerting operators to the presence and location of leaks, a proper leak confirmation and mitigation plan can be more quickly and efficiently determined and implemented. For example, in some embodiments, the method can aid the operator in determining whether or not a production tubing pressure integrity test (which can be costly and disruptive) to confirm a suspected leak is warranted. The method can be used as a tool to develop the strategy for well integrity and workover programs.

In accordance with some embodiments of the present disclosure, the integrity and safety ESP wells can be increased and well productivity and well life maximized in a cost-effective manner. Cross-flow of fluids between multiple reservoirs can be reduced or minimized, and the risk and severity of leakages, spills, blowouts, groundwater contamination, and other environmental impacts can be reduced or minimized.

Figure 1:
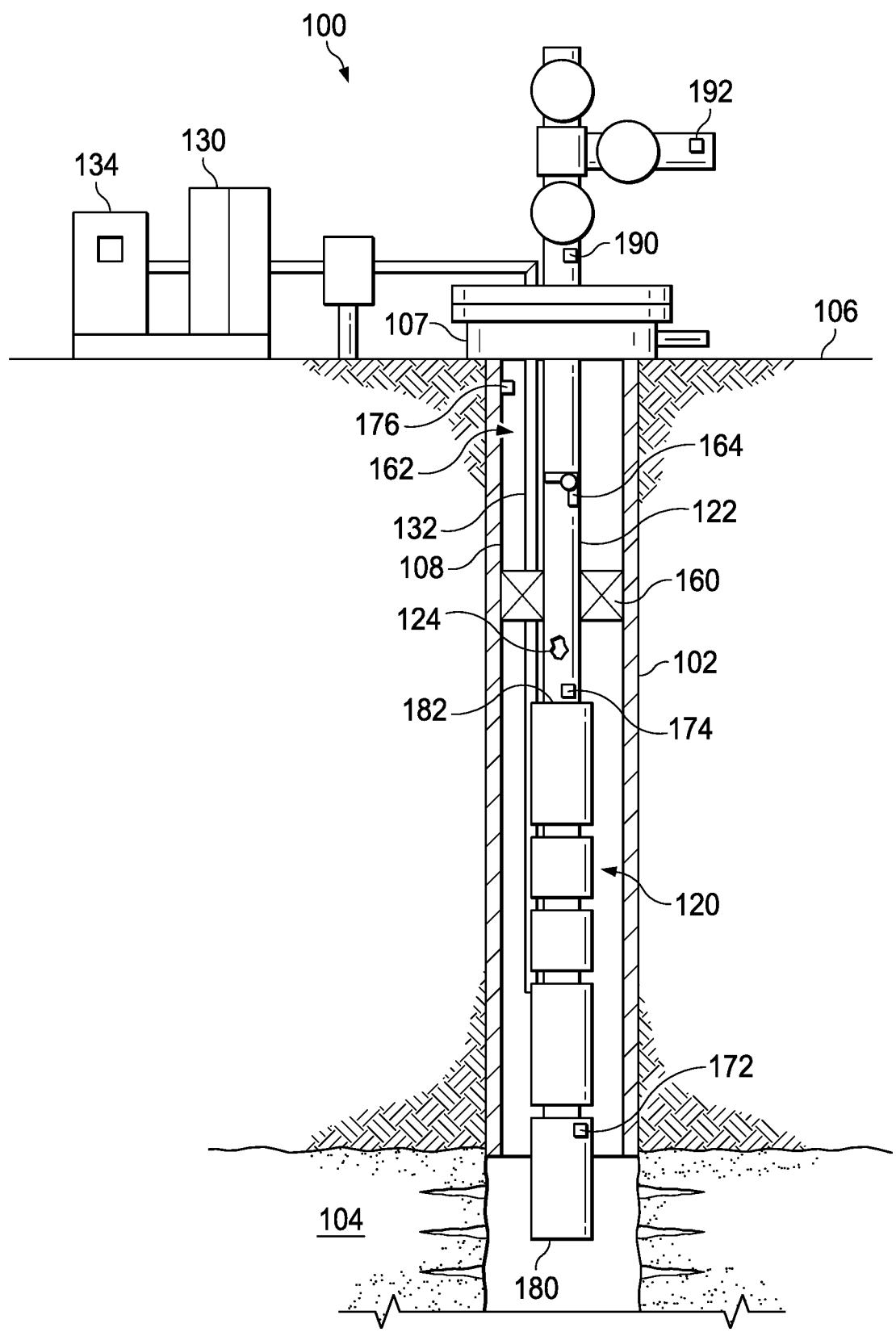
FIG. 1 is a schematic illustrations of a well that utilizes an electrical submersible pump in accordance with an embodiment of the present disclosure.

FIG. 1 is a schematic diagram of a well in accordance with an embodiment of the present disclosure. Referring to FIG. 1, well 100 includes a wellbore 102 drilled into a subterranean zone 104 from surface 106. Well 100 can be an oil and/or gas well, water well, or other wellbore drilled into subterranean zone 104 for purposes of oil and/or gas production or other purposes or applications, and can be drilled from a surface (land) location or an offshore location. Wellbore 102 in the illustrated embodiment is substantially vertical; however, in some embodiments the wellbore can include both vertical and other-than-vertical (such as substantially horizontal) portions, and can comprise a single wellbore or can include multiple lateral wellbores. Well 100 further includes a wellhead 107 which can include various spools, valves and adapters to provide pressure and flow control from well 100.

In the illustrated embodiment, casing 108 has been installed and cemented in place within wellbore 102 to stabilize the wellbore. An electrical submersible pump (ESP) 120 is positioned at a downhole end of production tubing string 122. ESP 120 in some embodiments comprise several staged centrifugal pump sections powered from surface electrical system 130. Surface electrical system 130 can include a junction box, transformer, motor controls, and other components to transmit power to ESP 120 via cable 132. ESP 120 is operable to draw oil or other fluids from subterranean zone 104 in an uphole direction through a central bore of production tubing string 122. In the illustrated embodiment, a packer 160 seals the tubing-casing annulus (TCA) 162 formed by the interior surface of casing 108 and the exterior surface of production tubing string 122, uphole of ESP 120. Packer 160 can be configured to isolate the TCA volume downhole of packer 160 from the TCA volume uphole of packer 160. In the illustrated embodiment, well 100 further includes a safety valve 164 (such as a surface controlled subsurface safety valve (SCSSV)) installed on production tubing string 122 and operable to close the central bore of production tubing string 122 and thereby prevent the flow of fluids in an uphole direction through production tubing string 122 in the event of an emergency or other circumstance.

Well 100 can include a plurality of downhole sensors to monitor various downhole parameters including but not limited to pressure, temperature, and vibration of ESP 120 and of its components and other downhole components of well 100. Three such downhole sensors are shown in FIG. 1: intake pressure sensor 172, discharge pressure sensor 174, and TCA pressure sensor 176. Intake pressure sensor 172 is positioned near an intake 180 of ESP 120 and configured to measure the pressure of fluids entering ESP 120 during ESP operation. Discharge pressure sensor 174 is positioned near a discharge end 182 of ESP 120 and configured to measure the pressure of fluids exiting ESP into the central bore of production tubing string 122, during ESP operation. TCA pressure sensor 176 is positioned within, and is configured to measure the pressure within, TCA 162. Well 100 can further include other downhole sensors such as sensors to measure the temperature of the motor components and/or intakes of ESP 120, and/or vibration of ESP 120 and/or its components.

Well 100 can include a plurality of surface sensors to monitor various surface parameters. Two such surface sensors are shown in FIG. 1: wellhead pressure sensor 190 and flow rate sensor 192. Wellhead pressure sensor 190 is positioned within, and configured to measure the pressure within, wellhead 107. Flow rate sensor 192 is configured to measure the flow rate of fluids exiting from well 100 at wellhead 107 from production tubing string 122. In some embodiments, flow rate sensor 192 can be part of a well testing unit on a testing barge or other suitable component or location on or within well 100 and its components. In some embodiments, well 100 can include other surface sensors to measure the voltage, amperage, frequency, and other parameters of surface electrical system 130 or other surface components.

Well 100 can further include a control system 134 to control the operation of surface electrical system 130, ESP 120 and/or other components or systems of well 100 and to receive and process data and measurements from the above-described downhole and surface sensors via wired or wireless connections. Control system 134 is described in more detail in reference to FIG. 15.

During operation of ESP 120 or at other times in the life of well 100, erosion, corrosion, and other factors can cause leaks in the wall of production tubing string 122, allowing fluid communication between the central bore of production tubing string 122 and TCA 162. In wells which include a packer (such as packer 160), such leaks can form above the packer and/or can form below the packer. In the illustrated embodiment, leaks 124 in production tubing string 122 are shown below packer 160. Such leaks (above or below the packer) can lead to decreased efficiency of ESP 120, lower production rates, ESP failure, uncontrolled release of fluids, and other undesirable or hazardous conditions or consequences.

Leaks in the production tubing string above a packer can be detected by a change in pressure within the tubing-casing annulus above the packer, as detected by, for example, TCA pressure sensor 176 located above packer 160. Such a change in pressure can be detected, for example, upon startup of the ESP, due to a portion of fluids pumped by the ESP exiting the production tubing string at the leaks and entering the TCA above the packer. However, detecting leaks in the production tubing string below the packer can be more challenging or problematic. In some embodiments of the present disclosure, leaks above or below the packer can be detected by integrating surface and downhole parameters.

Figure 2:
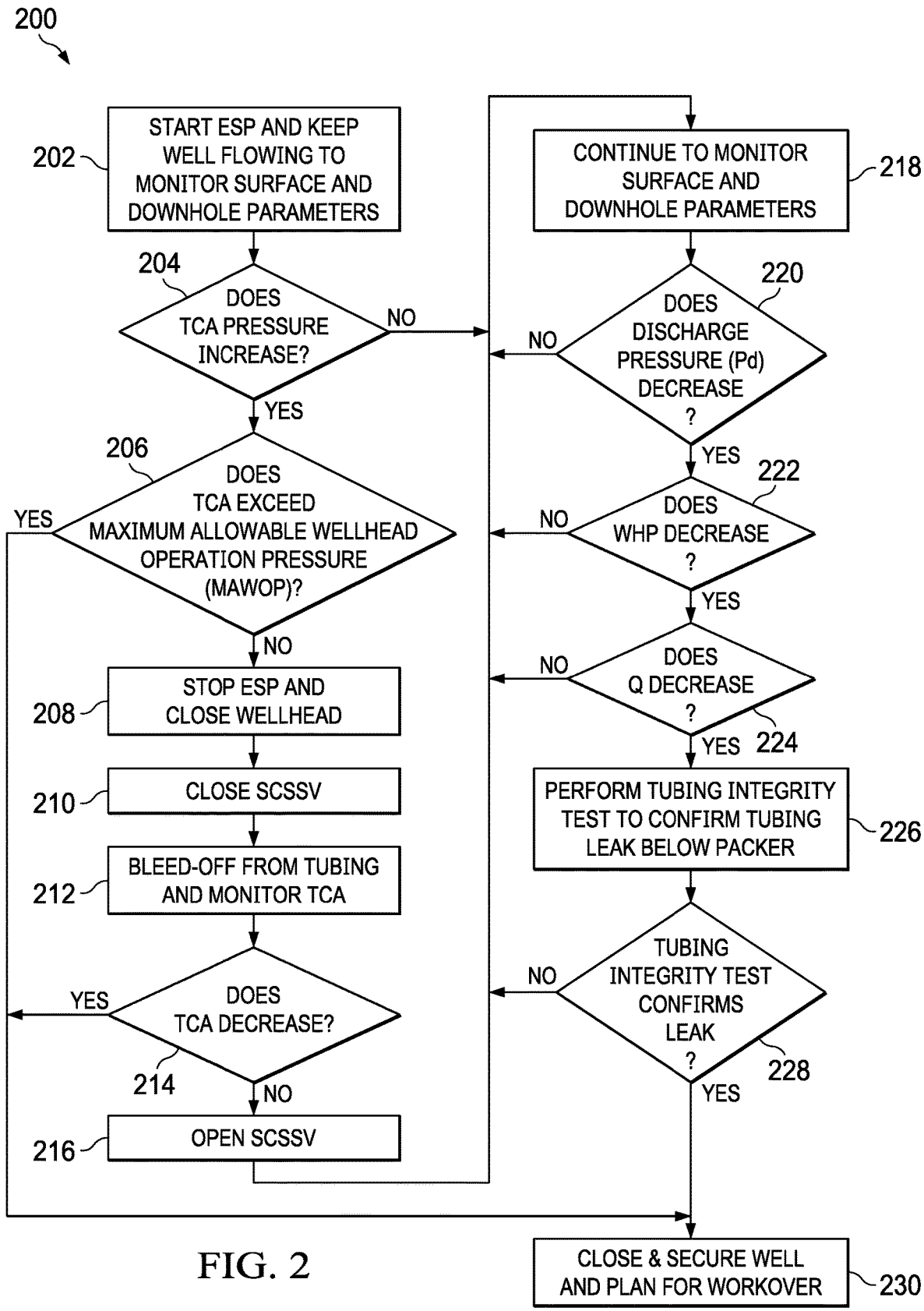
FIG. 2 is a process flow diagram of a method of determining a leak in a production tubing string of a well that utilizes an electrical submersible pump in accordance with an embodiment of the present disclosure.

FIG. 2 is a process flow diagram of a method 200 of determining a leak or leaks in a production tubing string of a well that utilizes an electrical submersible pump in accordance with an embodiment of the present disclosure. In some embodiments, an operator can receive some or all data from the downhole and surface sensors described above in reference to FIG. 1 (for example, via a screen or other output device of control system 134) and the operator can make some or all of the determinations, or initiate the determinations, actions, and other steps of method 200. In some embodiments, some or all of the steps of method 200 (including determinations and initiation of actions) can be performed automatically by a computerized control system (such as control system 134), with suitable output to, and input and control by, the operator.

The method begins at step 202 wherein the well is opened, the ESP is started, and the operator or system monitors surface parameters including wellhead pressure ("WHP") (for example, from wellhead pressure sensor 190 of FIG. 1) and surface flow rate (for example, from flow rate sensor 192 of FIG. 1), and also downhole parameters including ESP intake pressure ("Pi") (for example, from intake pressure sensor 172 of FIG. 1), ESP discharge pressure ("Pd") (for example, from discharge pressure sensor 174 of FIG. 1), and TCA pressure (for example, from TCA pressure sensor 176 of FIG. 1). In some embodiments, all of these parameters are monitored. In some embodiments, only some of these parameters are monitored. In some embodiments, other suitable downhole and/or surface parameters are also monitored. Proceeding to step 204, the operator or system determines, based on data from the pressure sensor located within the tubing-casing annulus, whether the TCA pressure increases upon startup of the ESP. If at step 204 the operator or system detects the increase in TCA pressure, then a leak in the production tubing string above the packer may be suspected, and the method proceeds to step 206 in which the operator or system determines if TCA pressure exceeds the maximum allowable wellhead operation pressure (MAWCP). If at step 206 the operator or system determines that the TCA pressure exceeds the MAWCP, then the method proceeds to step 230 in which the ESP is shut down, well is closed and secured, and a workover is initiated.

Returning to step 206, if the operator or system determines that the TCA pressure does not exceed the MAWCP, then the method proceeds to step 208 in which the ESP is shut down and the wellhead is closed. Proceeding to step 210, the operator or system initiates closure of the surface controlled safety valve (SCSSV). Proceeding to step 212, the operator or system initiates a bleeding off of the tubing pressure, while monitoring the TCA pressure. Proceeding to step 214, the operator or system determines whether TCA pressure decreases during the bleeding-off of the tubing pressure. If at step 214 the operator or system determines that the TCA pressure decreases during bleeding-off of the tubing pressure, then a leak in the production tubing string above the packer can be considered adequately confirmed (or strongly suspected and the method proceeds to step 232 in which the ESP is shut down, well is closed and secured, and a workover is initiated.

If at step 214, the operator or system determines that the TCA pressure does not decrease during bleeding-off of the tubing pressure, then the method proceeds to step 216 in which the operator or system initiates re-opening of the SCSSV and re-starting of the ESP. The method then proceeds to step 218, in which (as described further below) operation of the ESP continues and the operator or system continues to monitor the surface parameters and the downhole parameters.

Returning to step 204, if at step 204 the operator or system does not detect an increase in TCA pressure upon ESP startup, the method likewise proceeds to step 218 in which operation of the ESP continues and the operator or system continues to monitor the surface and downhole parameters. The method next proceeds to step 220, in which the operator or system determines, based on data from the discharge pressure sensor located at the discharge end of the ESP, whether the discharge pressure (Pd) has decreased over a specified time period. In some embodiments, the specified time period is twelve months. In some embodiments, the specified time period is greater or lesser time period (for example, thirty days, six months, or eighteen months, depending on the location and size of the suspected leak, discharge pressure, and other factors. If at step 220 the operator or system determines that Pd has not decreased over the specified time period, then the method returns to step 218 in which operation of the ESP continues and the operator or system continues to monitor the surface and downhole parameters.

If at step 220 the operator or system determines that Pd has decreased over the specified time period, the method proceeds to step 222 in which the operator or system determines, based on data from the pressure sensor located within the production tubing string at the wellhead, whether wellhead pressure (WHP) has decreased over the specified time period. If at step 222 the operator or system determines that WHP has not decreased over the specified time period, then the method returns to step 218 in which operation of the ESP continues and the operator or system continues to monitor the surface and downhole parameters.

If at step 222 the operator or system determines that WHP has decreased over the specified time period, the method proceeds to step 224 in which the operator or system determines, based on data from surface flow sensors located within the production tubing string at the surface whether the measured surface flow rate ("Q") of fluids exiting the production tubing string has decreased over the specified time period as compared to a calculated expected downhole flow rate, i.e., the expected rate of flow of fluids in an uphole direction from the ESP within the production tubing string. In some embodiments, the expected downhole flow rate can be calculated based on downhole parameters such as Pd and Pi and other suitable parameters. Such calculations can be made using SubPump software available from IHS Markit, DesignPro software available from Schlumberger, or other suitable software. If at step 226 the operator or system determines that the measured Q has not decreased as compared to the calculated downhole expected flow rate over the specified time period, then the method returns to step 218 in which operation of the ESP continues and the operator or system continues to monitor wellhead parameters and ESP sensor data.

If at step 226 the operator or system determines that Q has decreased as compared to the calculated downhole expected flow rate, the method proceeds to step 226 in which the operator or system initiates a tubing integrity test. In some embodiments, the tubing integrity test includes installing a plug in the production tubing string (such as via slickline) and applying pressure from the surface (for example, from a surface pumping unit) while monitoring for pressure changes indicative of a leak. Proceeding to step 228, the operator or system confirms, based on the tubing integrity test, whether any leakage from the production tubing string is occurring. If at step 228 the tubing integrity test does not confirm a tubing leak, then the method returns to step 218 in which operation of the ESP continues and the operator or system continues to monitor wellhead parameters and ESP sensor data. If at step 228 the operator or system confirms (based on the tubing integrity test) that leakage from the tubing is occurring, then the method proceeds to step 230 in which the ESP is shut down, well is closed and secured, and a workover is initiated.

In some embodiments, instead of performing all of steps 220, 222, and 224, only some of steps 220, 222, and 224 are performed. In some embodiments, additional surface or downhole parameter determination steps are performed in addition to steps 220, 222, and 224. For example, an increase in intake pressure (Pi) over the specified time period can provide further indication of the leak. Such an increase in Pi can be determined in response to (or in parallel with) other surface or downhole parameter determination steps (for example, in response to an indication of a decrease in Pd over the specified time period). Pi can vary based on the location of the leak, downhole circulation, and other factors.

In some embodiments, some or all of steps 220, 222, and 224 (and/or other steps) are performed simultaneously or in parallel instead of, or in a sequence or order different from, the sequence as described above. For example, in some embodiments, the wellhead pressure determination may be performed before, or at the same time as, the determination of the discharge pressure.

First Case Study

An ESP was installed at a depth of approximately 4000 feet below a packer in the well of the first case study, Well A. Table I lists certain properties of Well A, which was drilled into a sandstone reservoir:

TABLE I

Characteristics of Well A

| | |
|---|---|
| Water Cut, %: | 60 |
| Wellhead Pressure, psi: | 250 |
| ESP run life, days: | 1144 |
| Pump size: | WE 5500 |
| Stages: | 35 |
| Motor, horsepower: | 104 |
| $CO_2$, mole %: | 0.5 |
| $H_2S$, mole %: | 0 |

Figure 3:
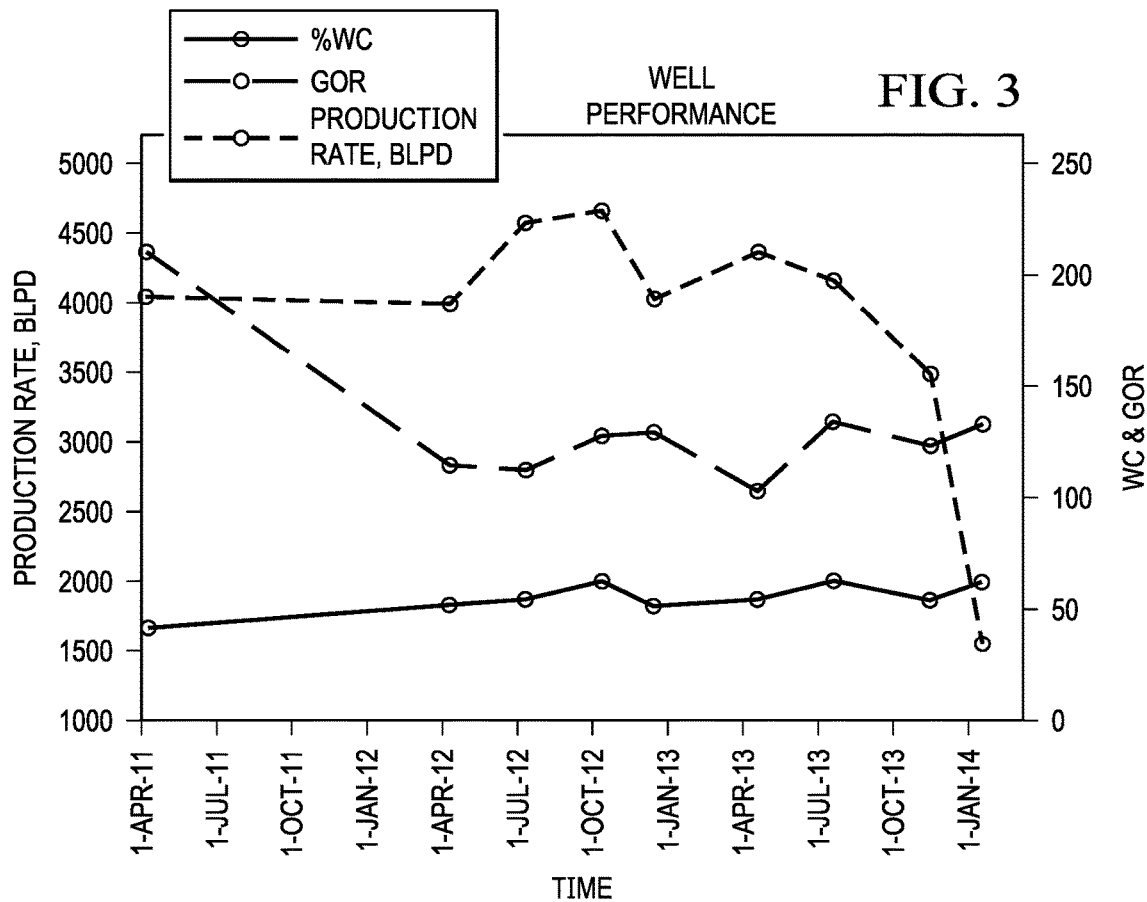
FIG. 3 illustrates well performance parameters of a well of a first case study over time, including production rate, water cut, and gas-oil-ratio.
Figure 4:
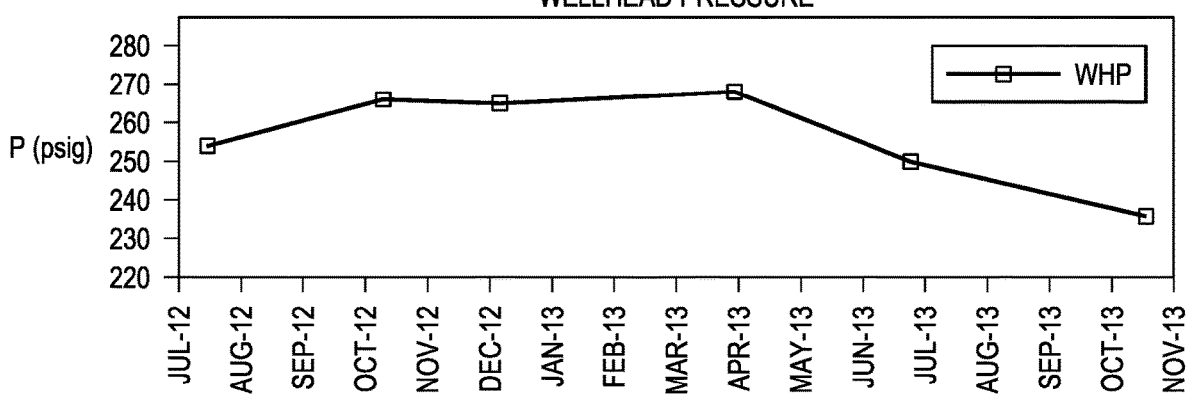
FIG. 4 illustrates wellhead pressure of the well of the first case study over time.
Figure 5:
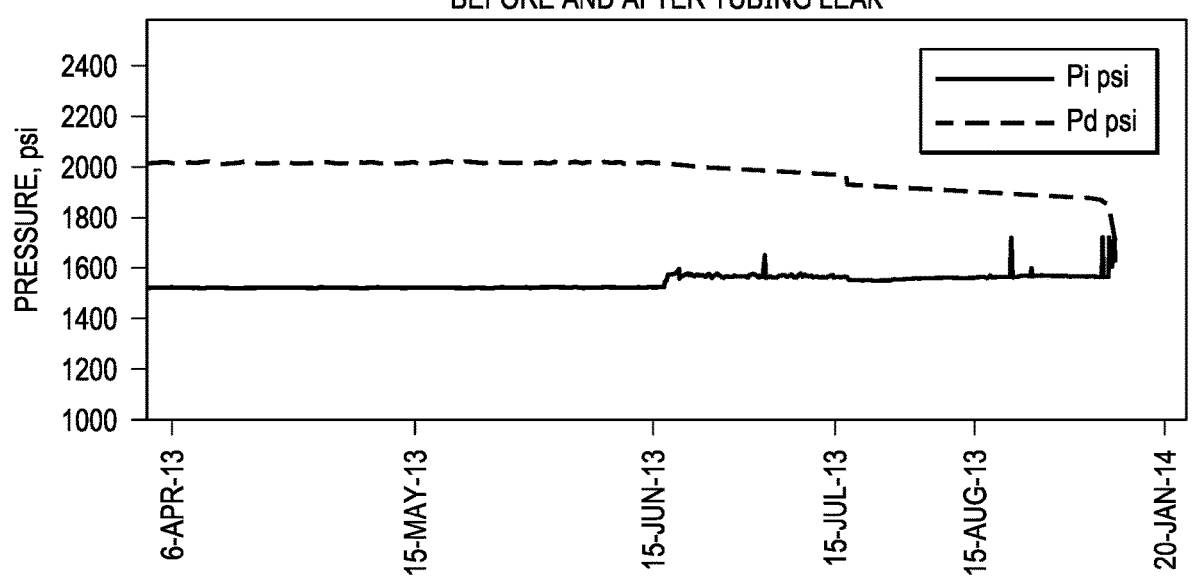
FIG. 5 illustrates discharge pressure and intake pressure of the well of the first case study over time.

FIG. 3 illustrates well performance parameters of Well A over time, including production rate, water cut (WC), and gas-oil-ratio (GOR). FIG. 4 illustrates wellhead pressure (WHP) of Well A over time. FIG. 5 illustrates discharge pressure (Pd, pressure at the discharge end of the ESP) and intake pressure (Pi, pressure at the intake of the ESP) over time. As can be seen from FIGS. 3, 4, and 5, production rate, wellhead pressure, discharge pressure, and intake pressure remain relatively constant for some period of time, and then production rate and wellhead pressure decline, discharge pressure becomes erratic and declines, and intake pressure becomes erratic and inclines. Upon inspection, leaks were confirmed in the production tubing string above the ESP of Well A, above and also below the packer.

Second Case Study

An ESP was installed at a depth of approximately 5000 feet below a packer in the well of the second case study, Well B. Table II lists certain properties of Well B, which was drilled into a sandstone reservoir:

TABLE II

Characteristics of Well B

| | |
|---|---|
| Water Cut, %: | 50 |
| Wellhead Pressure, psi: | 330 |
| Annulus pressure, psi: | 400 |
| ESP run life, days: | more than 1200 |
| Pump size: | WE 5500 |
| Stages: | 25 |
| Motor, horsepower: | 80 |
| $CO_2$, mole %: | 0.5 |
| $H_2S$, mole %: | 0 |

Figure 6:
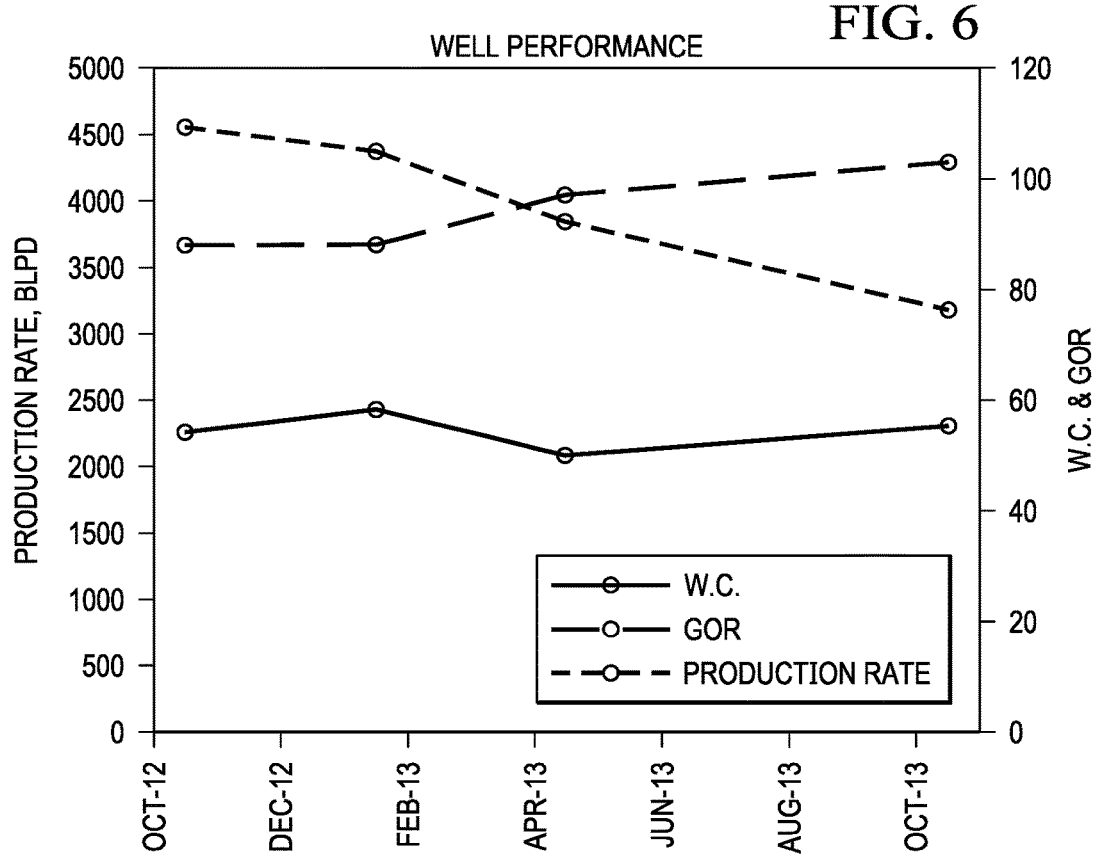
FIG. 6 illustrates well performance parameters of a well of a second case study over time, including production rate, water cut, and gas-oil-ratio.
Figure 7:
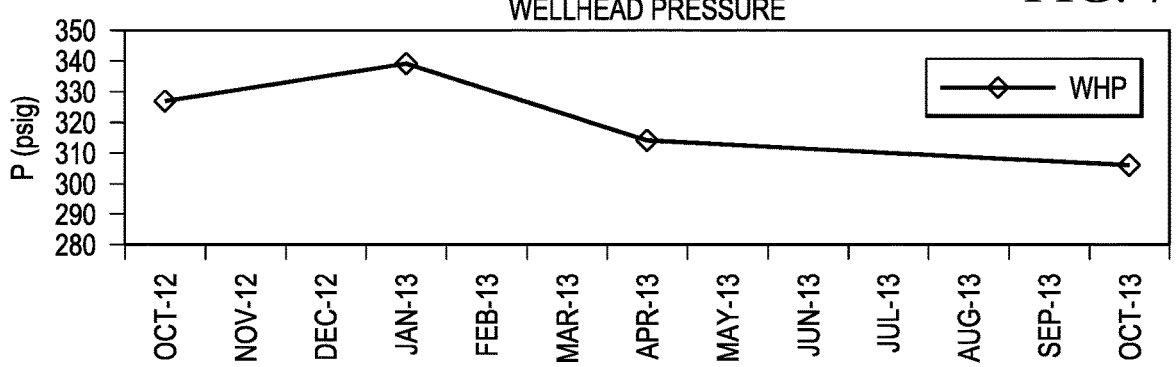
FIG. 7 illustrates wellhead pressure of the well of the second case study over time.
Figure 8:
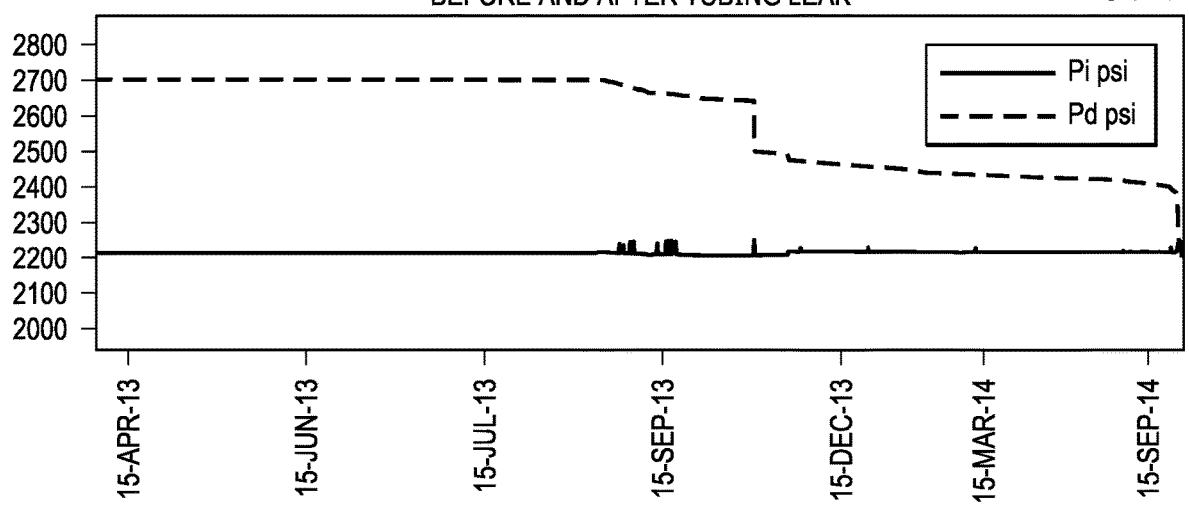
FIG. 8 illustrates discharge pressure and intake pressure of the well of the second case study over time.

FIG. 6 illustrates well performance parameters of Well B over time, including production rate, water cut (WC), and gas-oil-ratio (GOR) FIG. 7 illustrates wellhead pressure (WHP) of Well B over time. FIG. 8 illustrates discharge pressure (Pd, pressure at the discharge end of the ESP) and intake pressure (Pi, pressure at the intake of the ESP) over time. As can be seen from FIGS. 6, 7, and 8, production rate, wellhead pressure, discharge pressure, and intake pressure remain relatively constant for some period of time, and then production rate, wellhead pressure, and discharge pressure decline and intake pressure inclines. Upon inspection, leaks were confirmed in the production tubing string above the packer of Well B.

Third Case Study

An ESP was installed at a depth of approximately 4000 feet below a packer in the well of the third case study, Well C. Table III lists certain properties of Well C, which was drilled into a sandstone reservoir:

TABLE III

Characteristics of Well C

| | |
|---|---|
| Water Cut, %: | 50 |
| Wellhead Pressure, psi: | 330 |
| Annulus pressure, psi: | 0 |
| ESP run life, days: | 915 |
| Pump size: | WE 4000 |
| Stages: | 25 |
| Motor, horsepower: | 78 |
| $CO_2$, mole %: | 0.5 |
| $H_2S$, mole %: | 0 |

Figure 10:
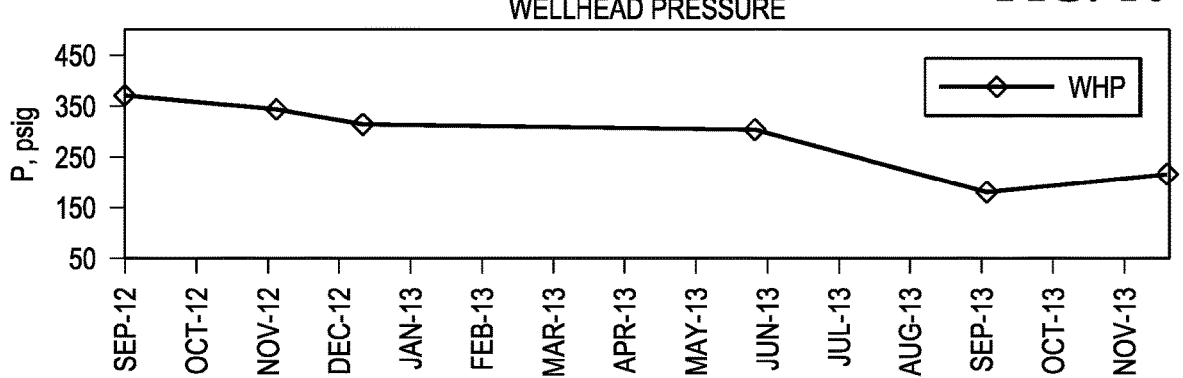
FIG. 10 illustrates wellhead pressure of the well of the third case study over time.
Figure 9:
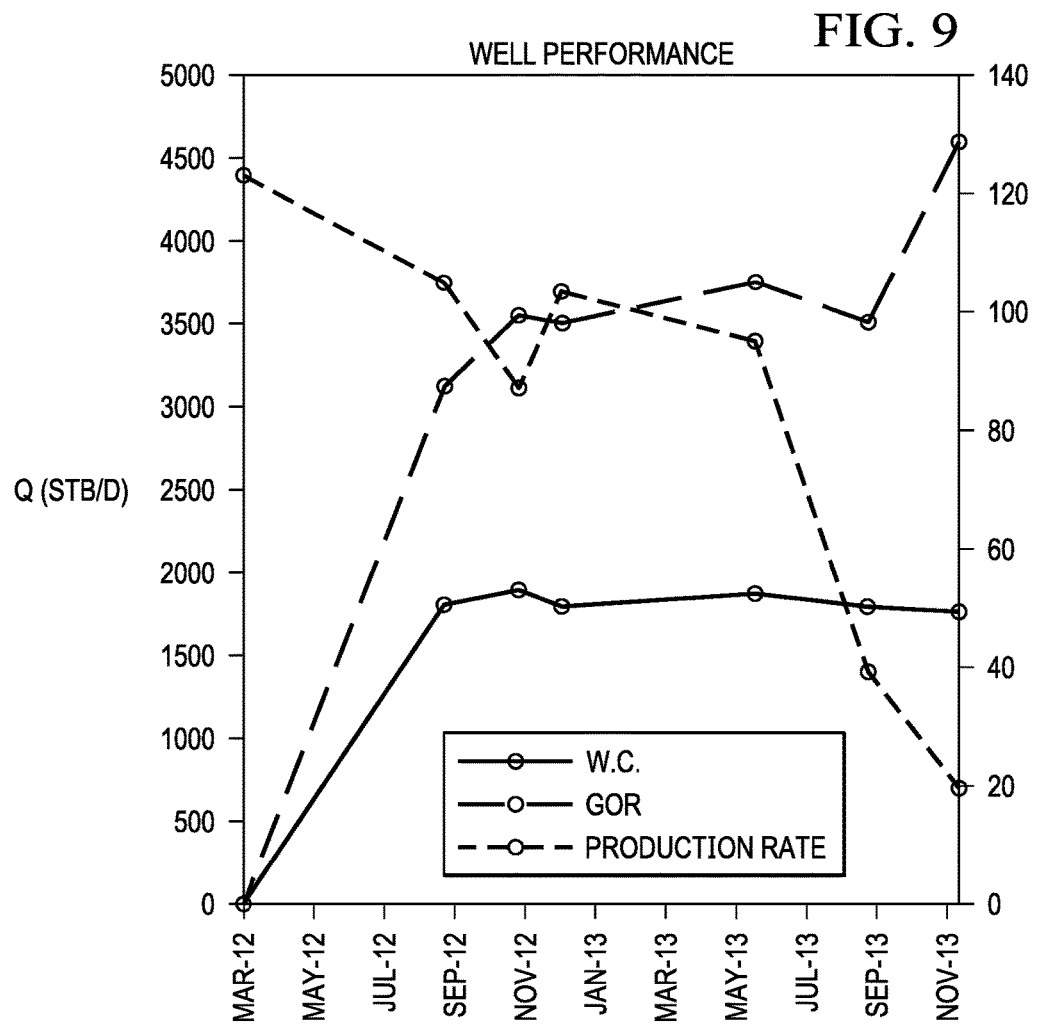
FIG. 9 illustrates well performance parameters of a well of a third case study over time, including production rate, water cut, and gas-oil-ratio.
Figure 11:
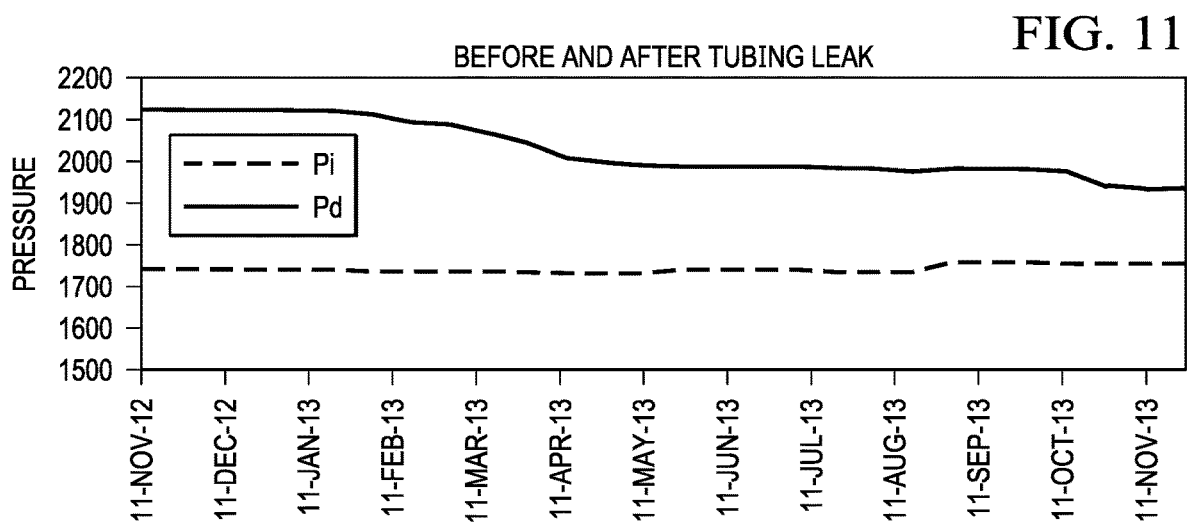
FIG. 11 illustrates discharge pressure and intake pressure of the well of the third case study over time.

FIG. 9 illustrates well performance parameters of Well C over time, including production rate, water cut (WC), and gas-oil-ratio (GOR) FIG. 10 illustrates wellhead pressure (WHP) of Well C over time. FIG. 11 illustrates discharge pressure (Pd, pressure at the discharge end of the ESP) and intake pressure (Pi, pressure at the intake of the ESP) over time. As can be seen from FIGS. 9, 10, and 11, production rate, wellhead pressure, discharge pressure, and intake pressure remain relatively constant for some period of time, and then production rate and wellhead pressure decline, discharge pressure gradually declines, and intake pressure gradually inclines. Upon inspection, leaks were confirmed in the production tubing string below the packer and above the ESP of Well C.

Fourth Case Study

An ESP was installed at a depth of approximately 4400 feet below a packer in the well of the fourth case study, Well D. Table IV lists certain properties of Well D, which was drilled into a sandstone reservoir:

TABLE IV

Characteristics of Well D

| | |
|---|---|
| Water Cut, %: | 50 |
| Wellhead Pressure, psi: | 350 |
| Annulus pressure, psi: | 0 |
| ESP run life, days: | 1100 |
| Pump size: | WE 5500 |
| Stages: | 25 |
| Motor, horsepower: | 80 |
| $CO_2$, mole %: | 0.5 |
| $H_2S$, mole %: | 0 |

Figure 12:
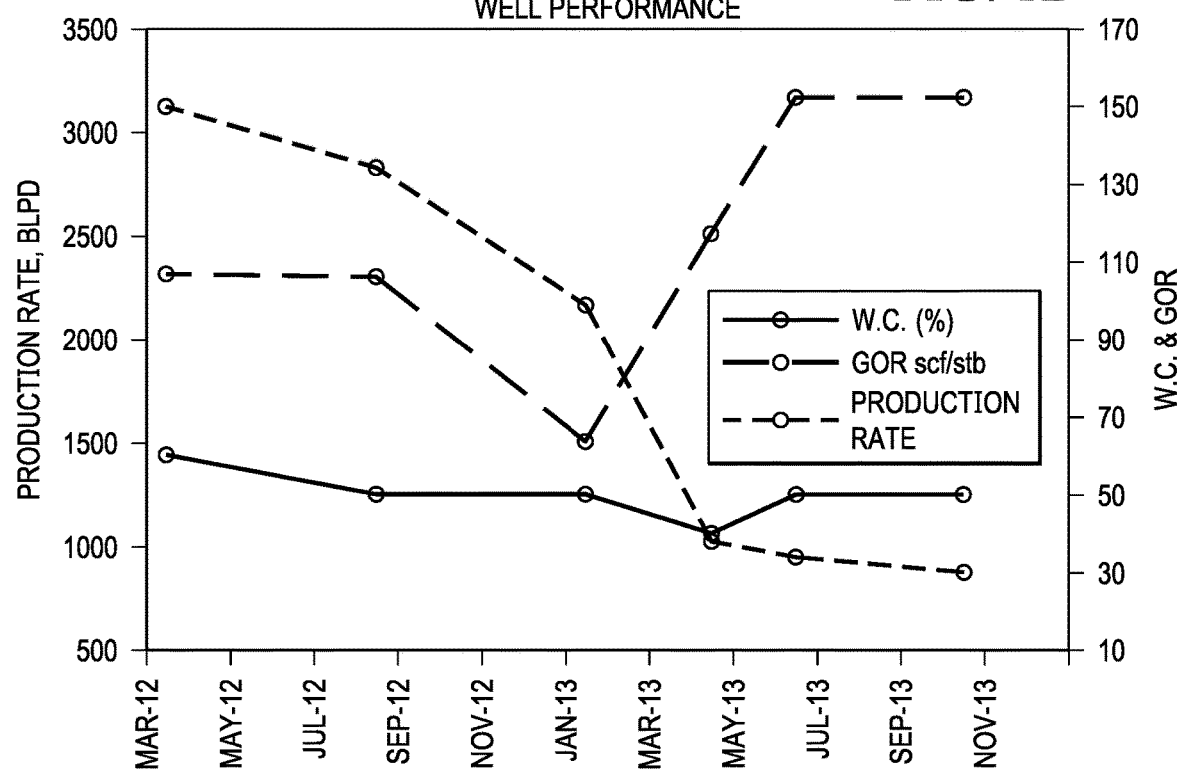
FIG. 12 illustrates well performance parameters of a well of a fourth case study over time, including production rate, water cut, and gas-oil-ratio.
Figure 13:
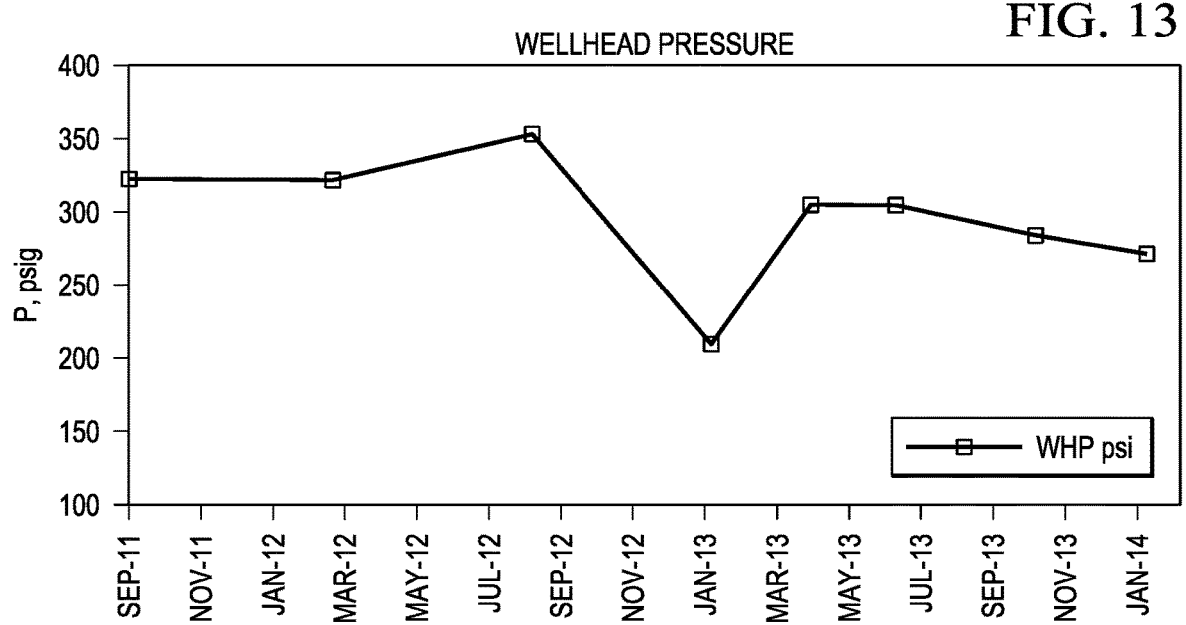
FIG. 13 illustrates wellhead pressure of the well of the fourth case study over time.
Figure 14:
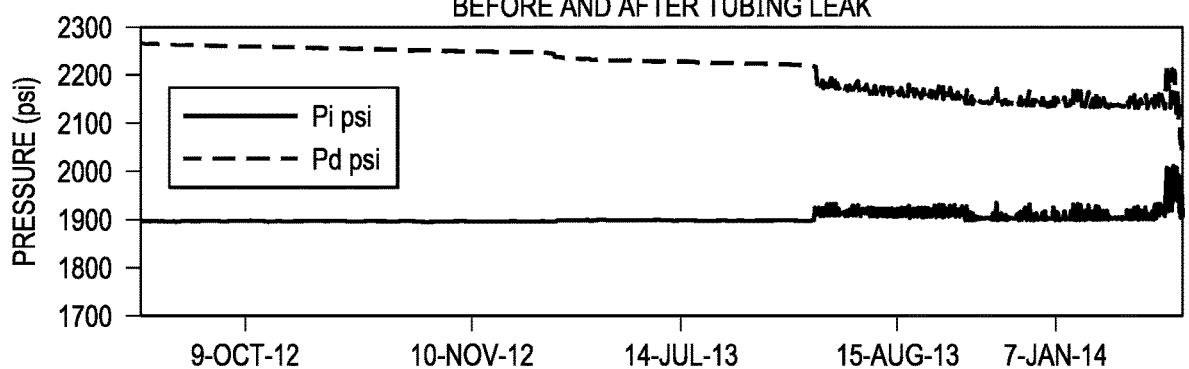
FIG. 14 illustrates discharge pressure and intake pressure of the well of the fourth case study over time.

FIG. 12 illustrates well performance parameters of Well D over time, including production rate, water cut (WC), and gas-oil-ratio (GOR). FIG. 13 illustrates wellhead pressure (WHP) of Well D over time. FIG. 14 illustrates discharge pressure (Pd, pressure at the discharge end of the ESP) and intake pressure (Pi, pressure at the intake of the ESP) over time. As can be seen from FIGS. 12, 13, and 14, production rate, wellhead pressure, discharge pressure, and intake pressure remain relatively constant for some period of time, and then production rate declines (along with an increase in the gas-oil-ratio), wellhead pressure gradually declines, discharge pressure becomes erratic and gradually declines, and intake pressure becomes erratic and gradually inclines. In addition, it was determined that the actual well flow rate at the surface (approximately 700 barrels per day) was significantly lower than the calculated expected flow rate calculated using SubPump software (approximately 7000 barrels per day), using intake pressure and other sensor data. Upon inspection, leaks were confirmed in the production tubing string below the packer and above the ESP of Well D.

Figure 15:
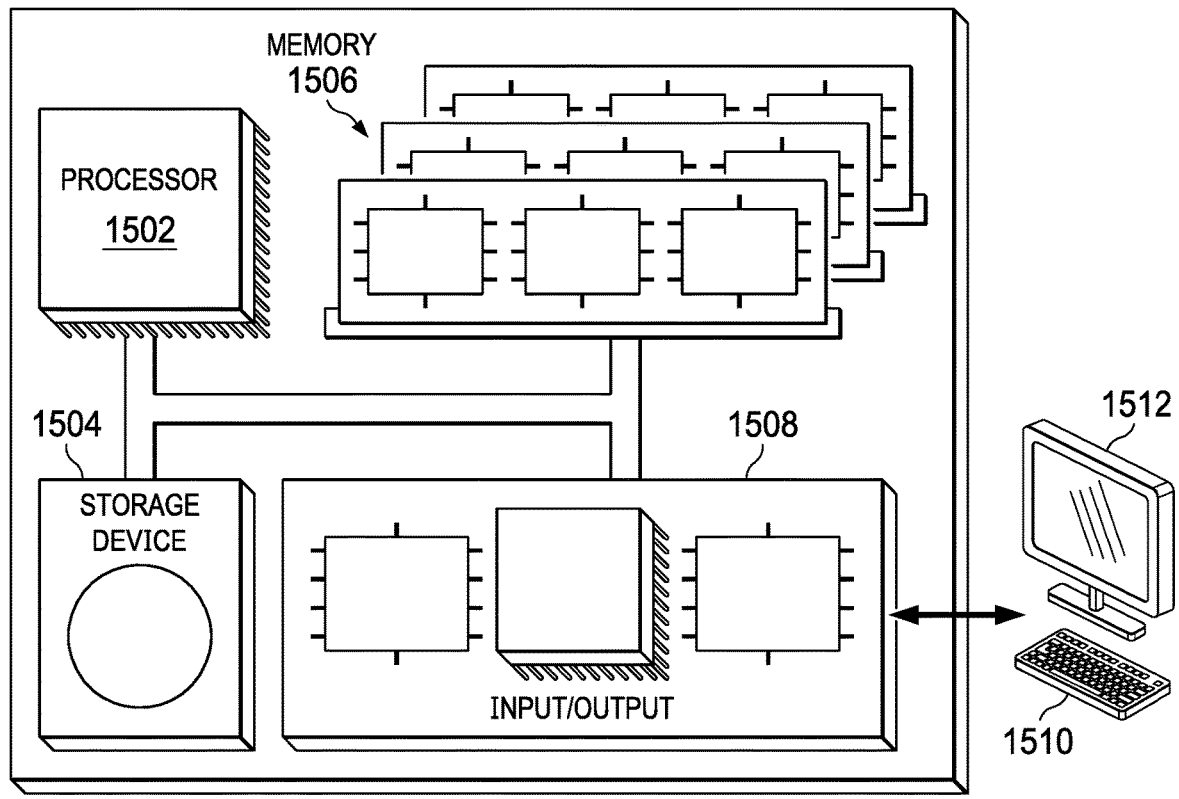
FIG. 15 is a schematic illustration showing an example control system of a well in accordance with an embodiment of the present disclosure.

FIG. 15 is a schematic illustration showing an example control system 134 of well 100 of FIG. 1 (and/or other suitable wells and well system and components of the present disclosure) for receiving pressure, temperature, flow rate, and other downhole and surface data, for calculating estimated pump or flow rates and performing other processes or analyses with respect to such data, and for performing various operations such as controlling valves, motors, and other surface and downhole components. In some implementations, the control system 134 includes one or more processors 1502, one or more storage devices 1504, memory 1506, input/output modules 1508, input devices 1510, and output devices 1512. Input devices 1510 can include, for example, a user interface such as a user keyboard or touch screen (not shown), sensors such as intake pressure sensor 172, discharge pressure sensor 174, TCA pressure sensor 176, wellhead pressure sensor 190, and/or flow rate sensor 192 as shown in FIG. 1, and/or other suitable sensors or input devices. Output devices can include, for example, a user display screen (not shown), and/or controls to activate and control sensors, valves, and other well components.

Control system 134 can include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device. The processor can be configured to process instructions for execution within the PLC and can be designed using any of a number of architectures such as a complex instruction set computers processor, a reduced instruction set computer processor, or a minimal instruction set computer processor. The processor can either be a single-threaded processor or a multi-threaded processor and can be capable of processing instructions stored in the memory or on the storage device to display graphical information for a user interface on the input/output device.

The memory can store information within the controller and can be a computer readable medium, a volatile memory unit or a non-volatile memory unit. The storage device can provide mass storage for the controller. The processor and the memory can also be supplemented by, or incorporated in, ASICs (application-specific integrated circuits). Similarly, the storage unit can be a computer-readable medium, a floppy disk device, a hard disk device, an optical disk device, a tape device, flash memory, a solid state device (SSD), or a combination. The input/output device provides input/output operations for the controller and can include a keyboard and/or pointing device, or a display unit for displaying graphical user interfaces. The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly in a computer to perform a certain activity or bring about a certain result. A computer program can be written in any form of programming language, including compiled or interpreted languages. The computer program can be deployed in any form, including as a stand-alone program or as a module, component, subroutine, or other unit suitable for use in a computing environment. For instance to accommodate interface with the user, the features can be implemented on a computer having a display device such as a CRT (cathode ray tube), LCD (liquid crystal display), or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms. The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A method of determining a presence of a leak in a wall of a production tubing string positioned within a well drilled into a subterranean formation, wherein an electrical submersible pump is positioned at a downhole end of the production tubing string and wherein the electric submersible pump is configured to pump fluids from the subterranean zone in an uphole direction through the production tubing string, the method comprising:
   (a) determining, based on measurements from a pressure sensor positioned at a downhole location at a discharge end of the electrical submersible pump, that a discharge pressure of fluid flowing from the electrical submersible pump in the uphole direction through the production tubing string has decreased over a specified time period;
   (b) determining, based on measurements from a pressure sensor positioned at a surface location within a wellhead of the well, that a pressure within the production tubing string at the surface has decreased over the specified time period;
   (c) determining, based on measurements from a flow-rate sensor positioned at an uphole end of the production tubing string, that a flow rate of fluids from the uphole end of the production tubing string has decreased relative to a calculated expected flow rate of fluids through the production tubing string at the discharge end of the electrical submersible pump over the specified time period;
   (d) initiating, in response to (a), (b), and (c), a pressure integrity test of the production tubing string; and
   (e) determining, based on the pressure integrity test, the presence of the leak.

2. The method of claim 1, further comprising determining, based on measurements from a pressure sensor positioned at a downhole location at an intake of the electrical submersible pump, that an intake pressure of fluid flowing into the electrical submersible pump has increased over the specified time period, and wherein the initiating of the pressure integrity test is further in response to the determining that the intake pressure has increased over the specified time period.

3. The method of claim 1, further comprising determining, based on a measurement from a pressure sensor positioned within a tubing-casing annulus of the well, that a tubing-casing annulus pressure has not increased in response an initiation of operation of the electrical submersible pump, and wherein the initiating of the pressure integrity test is further in response to the determining that the tubing-casing annulus pressure has not increased in response to the initiation of the operation.

4. The method of claim 3, wherein the well comprises a packer assembly positioned on the production tubing string above the electrical submersible pump, the packer assembly configured to prevent a flow of fluids within the tubing-casing annulus, and wherein the pressure sensor positioned within the tubing-casing annulus is uphole of the packer assembly.

5. The method of claim 4, wherein the leak is downhole of the packer assembly.

6. The method of claim 1, wherein the calculated expected flow rate of fluids through the production tubing string at the discharge end of the electrical submersible pump is based on an intake pressure of fluid flowing into the electrical submersible pump has increased over the specified time period.

7. The method of claim 1, wherein the determining of the presence of the leak is a first instance of a leak detection sequence, and wherein the method further comprises a second instance of a leak detection sequence, the second instance of the leak detection sequence comprising:
   determining, based on a first measurement from a pressure sensor positioned within a tubing-casing annulus of the well, that a tubing-casing annulus pressure has increased in response an initiation of operation of the electrical submersible pump;
   initiating a shut-down of the electrical submersible pump;
   closing a subsurface safety valve positioned on the production tubing string uphole of the electrical submersible pump;
   determining, while bleeding off pressure from within the production tubing string and based on a second measurement from the pressure sensor positioned within the tubing-casing annulus, that the tubing-casing annulus pressure has decreased in response to the bleeding off of the pressure; and
   determining, based on the decrease in the tubing-casing pressure in response to the bleeding off of the pressure, the presence of the leak.

8. The method of claim 7, wherein the well comprises a packer assembly positioned on the production tubing string above the electrical submersible pump, the packer assembly configured to prevent a flow of fluids within the tubing-casing annulus, and wherein the pressure sensor positioned within the tubing-casing annulus is uphole of the packer assembly.

9. The method of claim 8, wherein the leak is uphole of the packer assembly.

10. A computer-implemented method, comprising:
   (a) determining, by a computer system and based on measurements from a pressure sensor positioned at a downhole location at a discharge end of the electrical submersible pump, that a discharge pressure of fluid flowing from the electrical submersible pump in an uphole direction through the production tubing string has decreased over a specified time period;

(b) determining, by the computer system and based on measurements from a pressure sensor positioned at a surface location within a wellhead of the well, that a pressure within the production tubing string at the surface has decreased over the specified time period;

(c) determining, by the computer system and based on measurements from a flow-rate sensor positioned at an uphole end of the production tubing string, that a flow rate of fluids from the uphole end of the production tubing string has decreased relative to a calculated expected flow rate of fluids through the production tubing string at the discharge end of the electrical submersible pump over the specified time period;

(d) initiating, in response to (a), (b), and (c), a pressure integrity test of the production tubing string; and (e) determining, based on the pressure integrity test, the presence of the leak.

11. The computer-implemented method of claim 10, further comprising determining, by the computer system and based on measurements from a pressure sensor positioned at a downhole location at an intake of the electrical submersible pump, that an intake pressure of fluid flowing into the electrical submersible pump has increased over the specified time period, and wherein the initiating of the pressure integrity test is further in response to the determining that the intake pressure has increased over the specified time period.

12. The computer-implemented method of claim 10, further comprising determining, by the computer system and based on a measurement from a pressure sensor positioned within a tubing-casing annulus of the well, that a tubing-casing annulus pressure has not increased in response an initiation of operation of the electrical submersible pump, and wherein the initiating of the pressure integrity test is further in response to the determining that the tubing-casing annulus pressure has not increased in response to the initiation of the operation.

13. The computer-implemented method of claim 12, wherein the well comprises a packer assembly positioned on the production tubing string above the electrical submersible pump, the packer assembly configured to prevent a flow of fluids within the tubing-casing annulus, and wherein the pressure sensor positioned within the tubing-casing annulus is uphole of the packer assembly.

14. The computer-implemented method of claim 13, wherein the leak is downhole of the packer assembly.

15. The computer-implemented method of claim 10, wherein the calculated expected flow rate of fluids through the production tubing string at the discharge end of the electrical submersible pump is based on an intake pressure of fluid flowing into the electrical submersible pump has increased over the specified time period.

16. The computer-implemented method of claim 10, wherein the determining of the presence of the leak is a first instance of a leak detection sequence, and wherein the method further comprises a second instance of a leak detection sequence, the second instance of the leak detection sequence comprising:

determining, by the computer system and based on a first measurement from a pressure sensor positioned within a tubing-casing annulus of the well, that a tubing-casing annulus pressure has increased in response an initiation of operation of the electrical submersible pump;

initiating a shut-down of the electrical submersible pump;

closing a subsurface safety valve positioned on the production tubing string uphole of the electrical submersible pump;

determining, by the computer system and while bleeding off pressure from within the production tubing string and based on a second measurement from the pressure sensor positioned within the tubing-casing annulus, that the tubing-casing annulus pressure has decreased in response to the bleeding off of the pressure; and determining, based on the decrease in the tubing-casing pressure in response to the bleeding off of the pressure, the presence of the leak.

17. The computer-implemented method of claim 16, wherein the well comprises a packer assembly positioned on the production tubing string above the electrical submersible pump, the packer assembly configured to prevent a flow of fluids within the tubing-casing annulus, and wherein the pressure sensor positioned within the tubing-casing annulus is uphole of the packer assembly.

18. The computer-implemented method of claim 17, wherein the leak is uphole of the packer assembly.

* * * * *